US009533678B2

(12) United States Patent
Scholz et al.

(10) Patent No.: US 9,533,678 B2
(45) Date of Patent: Jan. 3, 2017

(54) METHOD FOR CONTROLLING A HYBRID DRIVE TRAIN OF A MOTOR VEHICLE

(75) Inventors: Jakob Scholz, Dusseldorf (DE); Tobias Zollner, Lindau (DE); Holger Bacher, Lindau (DE)

(73) Assignee: Friedrichshafen AG, Friedrichshafen (DE)

(*) Notice: Subject to any disclaimer, the term of this patent is extended or adjusted under 35 U.S.C. 154(b) by 372 days.

(21) Appl. No.: 14/130,537

(22) PCT Filed: Jun. 14, 2012

(86) PCT No.: PCT/EP2012/061319
§ 371 (c)(1),
(2), (4) Date: Jan. 2, 2014

(87) PCT Pub. No.: WO2013/007464
PCT Pub. Date: Jan. 17, 2013

(65) Prior Publication Data
US 2014/0136040 A1 May 15, 2014

(30) Foreign Application Priority Data
Jul. 13, 2011 (DE) .................. 10 2011 079 079

(51) Int. Cl.
*B60L 9/00* (2006.01)
*B60L 11/00* (2006.01)
(Continued)

(52) U.S. Cl.
CPC ............. *B60W 20/40* (2013.01); *B60K 6/48* (2013.01); *B60W 10/02* (2013.01); *B60W 10/06* (2013.01);
(Continued)

(58) Field of Classification Search
USPC .......................................... 701/22
See application file for complete search history.

(56) References Cited

U.S. PATENT DOCUMENTS 5,505,676 A * 4/1996 Bookshar ............. F16D 43/206
173/178
5,646,842 A * 7/1997 Schulz ................. F16H 61/0206
475/127
(Continued)

FOREIGN PATENT DOCUMENTS

DE 198 14 402 A1 10/1999
DE 102 04 981 A1 8/2003
(Continued)

OTHER PUBLICATIONS

International Search Report Corresponding to PCT/EP2012/061319 mailed Sep. 5, 2012.
(Continued)

*Primary Examiner* — Jean-Paul c Cass
(74) *Attorney, Agent, or Firm* — Davis & Bujold, PLLC; Michael J. Bujold (57) ABSTRACT

A method of controlling a hybrid drive-train of a vehicle having a combustion engine with a driveshaft, a transmission with an input shaft and an output shaft that drives a transfer box. An electric machine has a rotor that is connected to the transmission input shaft. A separator clutch is arranged between the engine driveshaft and the transmission input shaft. For coupling of the engine, the engine is first accelerated, with a rotational speed regulation, toward a target speed until a reference speed is reached or exceeded while the clutch remains disengaged, then, with continuous speed regulation, the engine is adjusted to a corrected target speed while the clutch is engaged until a target torque is obtained, then, with torque control, the engine is adjusted to the target torque while the clutch, with differential rotational speed regulation, is regulated to a target speed difference, and finally the clutch is engaged.

18 Claims, 3 Drawing Sheets

(51) Int. Cl.
*G05D 1/00* (2006.01)
*G05D 3/00* (2006.01)
*G06D 7/00* (2006.01)
*G06F 17/00* (2006.01)
*B60W 20/00* (2016.01)
*B60K 6/48* (2007.10)
*B60W 10/02* (2006.01)
*B60W 10/06* (2006.01)
*B60W 30/18* (2012.01)

(52) U.S. Cl.
CPC ........ *B60W 20/00* (2013.01); *B60W 30/18027* (2013.01); *B60K 2006/4825* (2013.01); *B60W 2710/025* (2013.01); *B60W 2710/027* (2013.01); *B60W 2710/0666* (2013.01); *Y02T 10/6221* (2013.01); *Y02T 10/6252* (2013.01); *Y10S 903/902* (2013.01)

(56) References Cited

U.S. PATENT DOCUMENTS

| | | |
|---|---|---|
| 6,543,561 B1 | 4/2003 | Pels et al. |
| 8,142,327 B2 | 3/2012 | Le Neindre et al. |
| 8,668,622 B2* | 3/2014 | Dobele .............. F16H 61/0403 477/71 |
| 2005/0211489 A1* | 9/2005 | Kowatari ................ B60K 6/44 180/243 |
| 2009/0156355 A1* | 6/2009 | Oh .......................... B60K 6/48 477/5 |
| 2009/0312143 A1* | 12/2009 | Allgaier ................ B60K 6/365 477/5 |
| 2010/0216596 A1* | 8/2010 | Kaltenbach ............ B60K 6/48 477/118 |
| 2011/0298310 A1* | 12/2011 | Ross ..................... H02K 41/06 310/20 |
| 2016/0229393 A1* | 8/2016 | McCullough ......... B60W 20/30 |

FOREIGN PATENT DOCUMENTS

| | | |
|---|---|---|
| DE | 10 2007 052 737 A1 | 6/2008 |
| DE | 10 2007 050 774 A1 | 4/2009 |
| DE | 10 2008 051 295 A1 | 4/2010 |
| FR | 2 887 496 A1 | 12/2006 |
| FR | 2 954 255 A1 | 6/2011 |
| WO | 2009/053299 A1 | 4/2009 |
| WO | 2011/086252 A1 | 7/2011 |

OTHER PUBLICATIONS

Written Opinion Corresponding to PCT/EP2012/061319 mailed Sep. 5, 2012.

German Search Report Corresponding to 10 2011 079 079.9 mailed Dec. 3, 2013.

\* cited by examiner

METHOD FOR CONTROLLING A HYBRID DRIVE TRAIN OF A MOTOR VEHICLE

This application is a National Stage completion of PCT/EP2012/061319 filed Jun. 14, 2012, which claims priority from German patent application serial no. 10 2011 079 079.9 filed Jul. 13, 2011.

FIELD OF THE INVENTION

The invention concerns a method for controlling a hybrid drive-train of a motor vehicle.

BACKGROUND OF THE INVENTION

Such a hybrid drive-train of a motor vehicle comprises an internal combustion engine with a driveshaft, an adjustable-ratio transmission with a transmission input shaft and a transmission output shaft in driving connection with an axle transmission or transfer box, an electric machine that can be operated at least as a motor having a rotor that is drive-connected to the transmission input shaft, and a separator clutch in the form of an automated friction clutch arranged between the driveshaft of the internal combustion engine and the transmission input shaft. With such a hybrid drive-train, starting from electrically powered driving operation with the separator clutch open, when increased power is called for the previously started internal combustion engine is accelerated to the rotational speed of the transmission input shaft and then coupled to the transmission input shaft by closing the separator clutch.

A parallel-action hybrid drive-train of the above type is widely known and can be regarded as the standard design of a parallel hybrid drive-train. It has the advantage that the motor vehicle concerned can optionally be driven in purely electrically powered operation with the internal combustion engine switched off, in purely internal combustion engine powered operation with the electric machine power switched off, or in hybrid driving operation with combined drive power from the internal combustion engine and the electric machine. During internal combustion engine driving operation the electric machine can if necessary also be operated as a generator and the current so produced can be used for supplying an on-board electrical system and/or for charging an electrical energy accumulator. In general the electric machine can also be operated as a generator when the motor vehicle is braked and the kinetic energy recovered thereby can be stored in an electrical energy accumulator.

The transmission is preferably designed to be automatically controlled, such that the gear ratio effective between the input and output shafts can be adjusted either in steps or continuously. Thus, the transmission can be an automated variable-speed transmission that can be shifted with traction force interruption, a planetary automatic transmission that can be shifted without traction force interruption, or a continuously variable transmission.

When a hybrid drive-train of this type is operating under electric power and a power increase is called for which can no longer be satisfied by the electric machine alone, the internal combustion engine has to be started and coupled to the input shaft in order, thereafter, to drive the motor vehicle under internal combustion engine power alone or together with the electric machine, i.e. in the hybrid driving mode, with a correspondingly increased traction force.

During accelerator pedal operation of the motor vehicle a higher power output of the drive aggregate, i.e. the electric machine and the internal combustion engine, is called for when the driver depresses the accelerator pedal farther, for example in order to accelerate the motor vehicle in order to overtake. When the vehicle is being operated with an activated speed regulation unit, a power output increase can be called for by the speed regulation unit, for example when driving onto an uphill stretch, in order to be able to maintain the specified desired speed.

A power output of the electric machine which is no longer sufficient for this can occur owing to a maximum torque of the electric machine predetermined by design and/or owing to an electrical energy accumulator which is no longer sufficiently charged. When a power increase is called for, to increase the traction force in particular from the internal combustion engine a downshift or increase of the transmission's gear ratio can also be carried out, and this gear ratio change can be carried out before, during or after the coupling of the internal combustion engine.

When a power increase is called for which triggers the switching on of the internal combustion engine, the internal combustion engine is first started and then, to enable the separator clutch to be closed with as little slip as possible and largely free from jerking, the internal combustion engine is accelerated approximately to the transmission input rotational speed before the separator clutch is substantially closed and the internal combustion engine thereby coupled to the transmission input shaft.

When the separator clutch is open the internal combustion engine can be started by means of a special starter which is permanently drive-connected to the driveshaft of the internal combustion engine. However, the internal combustion engine can also be drag-started in combination with the electric machine by partially closing the separator clutch, during which the electric machine preferably delivers a higher torque, and once a minimum starting rotational speed has been reached and the internal combustion engine has started, the separator clutch is opened again. Furthermore the internal combustion engine can also be impulse-started by the electric machine, but in this case the transmission has to be transiently opened for example by disengaging the currently loaded gear in an automated countershaft transmission or by opening a load-transmitting frictional shifting element of a planetary automatic transmission, and after the electric machine has accelerated the separator clutch is rapidly closed and then opened again once the internal combustion engine has started.

The acceleration of the internal combustion engine to the transmission input rotational speed, i.e. to the synchronous speed at the separator clutch, should take place as quickly as possible so that the drive torque increase usually demanded by the driver begins without significant time delay. When the acceleration of the internal combustion engine takes place automatically, i.e. by virtue of corresponding control or regulation of the operation of the internal combustion engine as such, to produce a high rotational speed gradient the torque produced by the internal combustion engine is first greatly increased and then, to avoid overshooting the target speed, sometimes reduced to zero.

Since the mass moment of inertia that results from the rapid acceleration of the internal combustion engine and acts upon its driveshaft is relatively large and difficult to control, the problem exists of how the internal combustion engine can be synchronized rapidly and as exactly as possible without overshooting the target rotational speed. On the other hand the load reduction of the internal combustion engine after or during the closing of the separator clutch should also take place as quickly as possible, but this conflicts with the sometimes necessary complete reduction of the torque produced in order to terminate the acceleration.

To overcome these problems, in methods for controlling a corresponding hybrid drive-train described in DE 198 14 402 C2 and DE 102 04 981 A1 it is in each case provided that the internal combustion engine is adjusted to the synchronous speed of the separator clutch, i.e. to the transmission input rotational speed, by means of a second electric machine such as a crankshaft-starter-generator connected to its driveshaft.

The method described in DE 198 14 402 C2 provides that by means of the electric machine, the internal combustion engine is accelerated in essence exactly to the current transmission input rotational speed and is then coupled to the transmission input shaft by closing the separator clutch. In this method, however, no account is taken of a possible change of the transmission input speed during the closing process of the separator clutch, caused by an acceleration or deceleration of the motor vehicle.

In contrast, the method according to DE 102 04 981 A1 provides that by means of the second electric machine the internal combustion engine is accelerated to a target speed higher than the current transmission input rotational speed, before the separator clutch is closed. The result is that during the closing of the separator clutch it can transmit a torque from the driveshaft of the internal combustion engine to the transmission input shaft, whereby a load change between overdrive operation and traction operation of the internal combustion engine, which is perceptible as an uncomfortable jerk, is avoided.

In contrast, DE 10 2007 050 774 A1 describes a method for controlling a corresponding hybrid drive-train, in which during rotational speed regulation the internal combustion engine accelerates automatically, i.e. without any assistance from an auxiliary drive, to the current transmission input rotational speed or to a speed higher than this by an offset value, before the separator clutch is closed to its gripping point and then, with farther closing of the separator clutch, the torque control is transferred from the electric machine to the internal combustion engine. From the torque variations in the average time diagram shown in FIG. 3 thereof it can be seen that the acceleration of the internal combustion engine to the transmission input speed and the closing of the separator clutch to its gripping point take a relatively long time, and that the torque produced by the internal combustion engine for acceleration is again reduced to zero in order to limit the speed increase, which delays and makes more difficult the subsequent load build-up of the internal combustion engine.

SUMMARY OF THE INVENTION

Accordingly, the purpose of the present invention is to indicate an improved method for controlling a hybrid drive-train of a motor vehicle of the type described at the beginning, with which the internal combustion engine accelerates automatically, i.e. without any assistance from an auxiliary drive, more rapidly and at the same time comfortably up to the transmission input rotational speed and can then be coupled to the input shaft by closing the separator clutch.

That objective is achieved in combination with the following characteristics:

in a first phase, the speed of the internal combustion engine is regulated toward a target speed that is higher than the current transmission input speed, until a reference rotational speed lower than the target speed has been reached or exceeded, while during this the separator clutch remains substantially open, in a second phase during which the speed regulation continues, the internal combustion engine is adjusted to a corrected target speed higher than the current transmission input speed, while the separator clutch is closed until a target torque of the internal combustion engine is produced, in a third phase, with speed control the internal combustion engine is adjusted to the target torque while the separator clutch is regulated by speed differential regulation to a target rotational speed difference, and in a fourth phase during which the speed regulation of the internal combustion engine continues, the separator clutch is adjusted or regulated to a closed condition specified for continuous operation.

Accordingly, the invention starts from a hybrid drive-train of a motor vehicle known in itself, which comprises an internal combustion engine with a driveshaft, an adjustable-ratio transmission with a transmission input shaft and with a transmission output shaft in driving connection with an axle transmission or transfer box, an electric machine that can be operated at least as a motor having a rotor drive-connected to the transmission input shaft, and a separator clutch in the form of an automated friction clutch arranged between the driveshaft of the internal combustion engine and the transmission input shaft.

Starting from electrically powered driving operation with the separator clutch open, when a demand for increased power occurs, then in order to couple the previously started internal combustion engine to the transmission input shaft as quickly and comfortably as possible, i.e. without jerkiness, by accelerating the internal combustion engine and by closing the separator clutch, it is provided according to the invention that in a first phase the speed of the internal combustion engine is regulated toward a target rotational speed which is higher than the current transmission input speed, while the separator clutch remains substantially open.

When a reference speed lower than the target rotational speed is reached or exceeded, i.e. before reaching the target speed, then in a second phase the closing of the separator clutch is commenced until a target torque of the internal combustion engine is produced, while with continuation of the rotational speed regulation the internal combustion engine is adjusted to a corrected target speed higher than the current transmission input speed. Since already before the target speed or corrected target speed has been reached the internal combustion engine is acted upon by a load torque owing to the closing of the separator clutch, the active speed regulation of the internal combustion engine prevents a rapid reduction of the motor torque previously built up for accelerating the internal combustion engine. Thus, in contrast to known methods the acceleration of the internal combustion engine to the transmission input speed and the load build-up of the internal combustion engine for the at least partial takeover of the drive torque of the motor vehicle take place with a time overlap, and therefore more rapidly. In addition, this avoids a torque interruption of the internal combustion engine that occurs when the acceleration and the load build-up of the internal combustion engine take place consecutively, and which is perceptible as a jerk.

In a third phase, instead of with the previously carried out rotational speed regulation, the internal combustion engine is now adjusted by torque control to the target torque, while instead of with the previously carried out regulation of its closing the separator clutch is regulated by differential speed regulation to a target rotational speed difference.

Then, in a fourth phase during which the torque control of the internal combustion engine is continued, the separator clutch is adjusted or regulated to a closed condition specified for continuous operation.

To obtain rapid response behavior during the second phase, the separator clutch is held at its touch-point during the first phase if at the beginning of the first phase, for example once the internal combustion engine has been drag-started or impulse-started, the clutch has already been closed as far as its touch-point, or if at the beginning of the first phase, for example because of an independent start of the internal combustion engine by a special starter the separator clutch is fully open, the clutch is closed to its touch-point.

In order on the one hand to avoid marked overshooting of the engine speed above the transmission input rotational speed and on the other hand to allow sufficient scope for regulating and adjusting the engine speed, the target speed of the internal combustion engine is preferably set higher by a speed offset of around 50 to 200 revolutions per minute above the transmission input speed at the beginning of the first phase. A sufficiently large speed offset is also intended to ensure that during the closing of the separator clutch the engine speed approaches the transmission input speed from higher speed values, since this avoids a load change at the separator clutch which is perceptible as an uncomfortable jerk. As is known, a slipping friction clutch can only transmit a torque from the faster-rotating part of the clutch to the slower-rotating part thereof. If the engine speed were to approach the transmission input speed starting from lower speed values, the separator clutch would therefore first transmit a torque from the transmission input shaft to the driveshaft of the internal combustion engine before, after passing its gripping point, the separator clutch transmitted any torque from the internal combustion engine to the transmission input shaft.

The desired speed of the speed regulation of the internal combustion engine can be increased to the target speed at the beginning of the first phase, optionally abruptly or gradually, preferably along a gradient from the current engine speed, i.e. the idling speed. An abrupt increase of the desired speed necessarily leads to a steeper and therefore more rapid speed increase of the internal combustion engine with a greater tendency to overshoot the target speed. On the other hand a steady or gradual increase of the desired speed results in a flatter and thus slower speed increase of the internal combustion engine, but with less tendency to overshoot the target speed.

To achieve an optimum beginning of the process of closing the separator clutch, the reference speed for ending the first phase is expediently defined in relation to the current transmission input speed and can therefore correspond to the current transmission input speed or be above or below the current transmission input speed by a defined rotational speed offset.

From the beginning of the second phase, the corrected target speed of the speed regulation of the internal combustion engine can be kept at a constant speed interval away from the transmission input speed.

To reduce the rotational speed difference at the separator clutch and thereby reduce the thermal loading of the separator clutch, it can also be provided, however, that the corrected target speed of the speed regulation of the internal combustion engine in the second phase is kept at a lower level, between the target speed in the first phase and the current transmission input speed. In such a case, to avoid instabilities it is expedient to reduce the desired speed of the speed regulation of the internal combustion engine at the beginning of the second phase in a steady manner, in particular along a gradient, from the target speed of the first phase to the corrected target speed.

The target torque of the internal combustion engine can be determined from a torque desired by the driver in relation to the transmission input shaft by subtracting the current torque of the electric machine, or by subtracting the current torque of the electric machine and a defined offset torque. The driver's desired torque is usually deduced from the accelerator pedal's position and/or the change thereof and/or the rate of change of the accelerator pedal's position.

The closing process of the separator clutch preferably takes place in such manner that the desired separator clutch torque to be produced by closing the separator clutch is increased steadily at the beginning of the second phase, in particular along a gradient, to the target torque of the internal combustion engine.

During this, in order to avoid closing the separator clutch too quickly, the closing rate of the separator clutch can be limited by maintaining a minimum rotational speed difference and/or by maintaining a maximum speed gradient between the components forming the two sides of the clutch.

Since in the second phase, during the adjustment to the corrected rotational speed the internal combustion engine has to produce in essence the transmissible torque set at the separator clutch at the time, plus a positive or negative regulation torque for increasing or reducing the engine speed, in a further embodiment of the invention during the second phase the torque that can be transmitted by the separator clutch, determined by how far it is closed at the time, is used as a pilot torque or as part of a pilot torque for the speed regulation of the internal combustion engine.

Preferably, the second phase ends when the internal combustion engine has reached its target speed to within a specified differential speed tolerance, and when the size of the differential speed gradient at the separator clutch has reached or fallen below a defined minimum differential speed gradient, or when the size of the difference between the torque produced by the internal combustion engine and the torque that can be transmitted by the separator clutch has reached or fallen below a defined minimum torque difference.

To reduce the thermal loading of the separator clutch, the target rotational speed difference of the differential speed regulation of the internal combustion engine is preferably made smaller than the speed difference at the beginning of the third phase.

To regulate the target speed with as little fluctuation as possible, at the beginning of the third phase the desired speed of the speed regulation of the separator clutch is preferably decreased steadily, in particular along a gradient, from the current speed difference to the target speed difference.

Since in the third phase, during its regulation to the target speed difference the separator clutch has in essence to transmit the torque produced by the internal combustion engine at the time plus a positive or negative regulation torque for reducing or increasing the speed difference, in the third phase the current torque of the internal combustion engine is preferably used as a pilot torque or as part of a pilot torque for the differential speed regulation of the separator clutch.

Preferably, the third phase ends when the speed difference at the separator clutch has reached the target speed difference to within a specified differential speed tolerance.

In the fourth phase the separator clutch is completely closed if no continuous slip regulation of the separator clutch is provided or, with continuation of the differential speed regulation, the separator clutch is regulated to a lower target speed difference suitable for sustained slipping operation if continuous slip regulation of the separator clutch is provided. By means of continuous slip regulation of the separator clutch, the rotation fluctuations originating from the internal combustion engine are damped, so that a rotation fluctuation damper otherwise necessary for this can be dispensed with and/or a corresponding control of the electric machine for that purpose can be omitted.

BRIEF DESCRIPTION OF THE DRAWINGS

To clarify the invention the description of drawings with example embodiments are attached. The drawings show.

DETAILED DESCRIPTION OF THE PREFERRED EMBODIMENTS

Figure 3:
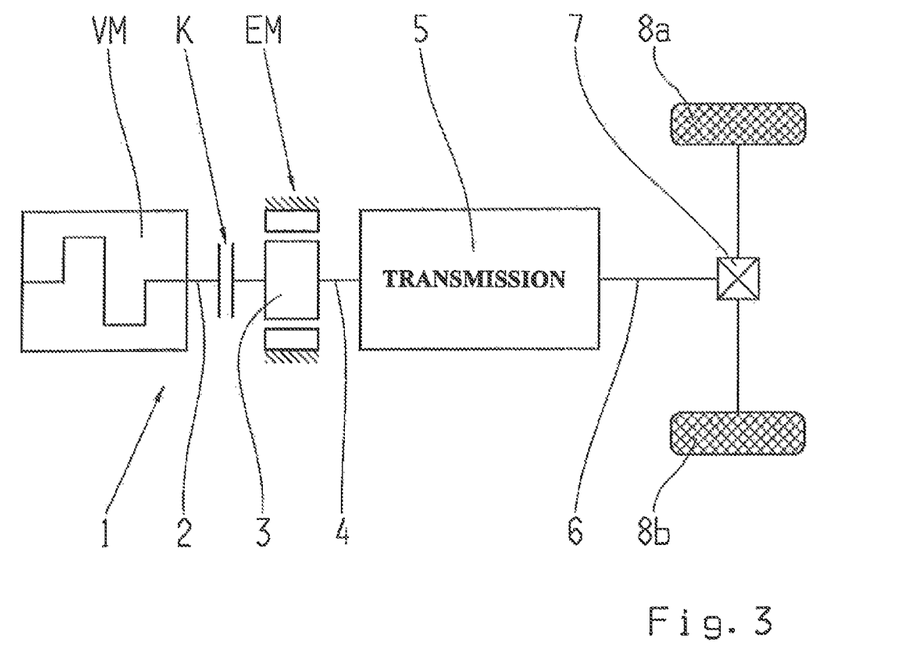
FIG. 3: A schematic view of a parallel-action hybrid drive-train for applying the control method to be described further with the help of FIGS. 1a to 1c and 2a to 2c.

FIG. 3 illustrates, in schematic form, a parallel-action hybrid drive-train 1 of a motor vehicle, with which the control method according to the invention described below can be applied.

The hybrid drive-train 1 has an internal combustion engine VM with a driveshaft 2, an electric machine EM that can be operated at least as a motor with a rotor 3, and a transmission 5 with a transmission input shaft 4 and a transmission output shaft 6. The electric machine EM is arranged coaxially over the transmission input shaft 4 and in this case, as a example, the rotor 3 of the electric machine EM is connected in a rotationally fixed manner directly to the transmission input shaft 4. Alternatively, the rotor 3 of the electric machine EM could be drive-connected to the transmission input shaft 4 by way of a step-down transmission stage, so enabling a coaxial or axis-parallel arrangement of the electric machine EM relative to the transmission input shaft.

With the direct connection of the rotor 3 of the electric machine EM to the transmission input shaft 4 assumed in the present case, the rotational speeds of the electric machine $n_{EM}$ and of the transmission input shaft $n_{GE}$ are thus identical ($n_{EM}=n_{GE}$). Between the driveshaft 2 of the internal combustion engine VM and the transmission input shaft 4 is arranged a separator clutch K in the form of an automated friction clutch. The transmission 5 is preferably an automated multi-stage variable-speed transmission, i.e. an automated variable-speed transmission or an automatic planetary transmission, but it can also be a manually shifted transmission or a continuously adjustable transmission. The transmission output shaft 6 is drive-connected by way of an axle differential 7 to the drive wheels 8a, 8b of a drive axle of the motor vehicle. In an all-wheel vehicle the transmission output shaft 6 would be in driving connection with a transfer box.

If a motor vehicle with a hybrid drive-train 1 of such type is being driven in traction operation purely under electric power, i.e. with the internal combustion engine VM switched off and the separator clutch K open, then owing to a demand from the driver or from a regulation unit for more power it can become necessary to start the internal combustion engine VM and couple it drive-effectively to the transmission input shaft 4. For this, the previously started internal combustion engine VM must be accelerated approximately to the transmission input speed $n_{GE}$ and the separator clutch K must be substantially closed.

Below, with reference to the rotational speed variations $n_{VM}(t)$, $n_{GE}(t)$ of the internal combustion engine VM and the transmission input shaft 4, shown in FIG. 1a, the torque variations $M_{VM}(t)$ of the internal combustion engine VM, $M_K(t)$ of the separator clutch K, and $M_{EM}(t)$ of the electric machine EM and also the torque $M_{FW}(t)$ desired by the driver, shown in FIG. 1b, and the closing degree variation $x_K(t)$ of the separator clutch K, shown in FIG. 1c, it will be explained how, in a first method variant, after having been started the internal combustion engine VM is coupled to the transmission input shaft 4.

When a demand for more power is received, first of all the internal combustion engine is started between times t0 and t1. In the present case this is done for example by a drag start in which, while operating with slip, the separator clutch K is briefly partially closed and the internal combustion engine VM is entrained into rotation until it has reached a minimum starting speed sufficient for it to start. Since the drag torque needed for this is applied by virtue of a simultaneous, brief increase of the torque $M_{EM}$ delivered by the electric machine EM, the starting process of the internal combustion engine VM advantageously has no effect on the transmission input speed $n_{GE}$. Once the internal combustion engine VM has been started, at time t1 it runs at its idling speed $n_{VM\_idle}$. After the drag starting of the internal combustion engine VM, the separator clutch K has been opened not completely ($x_K=0$), but only as far as its touch-point ($x_K=x_A$), so it can thereafter be closed again without any delay.

The actual coupling of the internal combustion engine VM to the transmission input shaft 4 takes place between times t1 and t5 and begins when, in a first phase (t=t1 to t2), the internal combustion engine VM is accelerated with rotational speed regulation in the direction toward a target speed $n_{VM\_Z1}$ which is higher than the current transmission input speed $n_{GE}$ ($n_{VM\_Z1}>n_{GE}$). At the beginning of the first phase (t=t1) the target speed $n_{VM\_Z1}$ of the internal combustion engine VM is set at a value higher than the transmission input speed $n_{GE}$ by a rotational speed offset $\Delta n_{OS1}$ of about 50 to 200 revolutions per minute ($n_{VM\_Z1}=n_{GE}(t1)+\Delta n_{OS1}$).

The desired speed $n_{VM\_soll}$ of the speed regulation of the internal combustion engine VM is increased abruptly at the beginning of the first phase (t=t1) from the idling speed $n_{VM\_idle}$ to the target speed $n_{VM\_Z1}$, which results in a relatively steep speed increase $dn_{VM}/dt$ of the internal combustion engine VM. When a reference speed $n_{Ref}$ lower than the target speed $n_{VM\_Z1}$, which in the present case is defined as equal to the current transmission input speed $n_{GE}$ ($n_{Ref}=n_{GE}(t2)$), has been reached or exceeded by the engine speed $n_{VM}$ ($n_{VM} \geq n_{Ref}$), the first phase ends (t=t2) and a second phase (t=t2 to t3) begins.

In the second phase the speed regulation of the internal combustion engine VM is continued. At the same time, however, to produce a target torque $M_{VM\_Ziel}$ of the internal combustion engine VM that can be deduced from the torque $M_{FW}$ desired by the driver, the separator clutch K is closed with a steady increase of the torque $M_K$ that it can transmit. During this the internal combustion engine VM is regulated to a corrected target speed $n_{VM\_Z2}$, with which in the present case the speed difference $\Delta n_{OS3}$ from the transmission input speed $n_{GE}$ at time t2 is kept constant ($n_{VM\_Z2}=n_{GE}+\Delta n_{OS3}$).

The second phase ends (t=t3) when the internal combustion engine VM has reached its target speed $n_{VM\_Z2}$ to within a specified differential speed tolerance and when the size of the differential speed gradient $d\Delta n_K/dt$ at the separator clutch K has reached or fallen below a defined minimum differential speed gradient $(d\Delta n_K/dt)_{min}$ ($|d\Delta n_K/dt| \leq (d\Delta n_K/dt)_{min} > 0$), or the size of the difference between the torque $M_{VM}$ produced by the internal combustion engine VM and the torque $M_K$ that can be transmitted by the separator clutch K has reached or fallen below a specified minimum torque difference $\Delta M_{min}$ ($|M_{VM}-M_K| \leq \Delta M_{min} > 0$).

In the subsequent, third phase (t=t3 to t4) the internal combustion engine VM is adjusted in a controlled manner to the target torque $M_{VM\_Ziel}$ and at the same time, by differential speed regulation, the separator clutch K is adjusted to a target rotational speed difference $\Delta n_{K\_Z1}$. For this purpose, for example, the target torque $M_{VM\_Ziel}$ of the internal combustion engine VM is increased steadily and the torque $M_{EM}$ delivered by the electric machine EM is correspondingly reduced. The target rotational speed difference $\Delta n_{K\_Z1}$ of the differential speed regulation of the separator clutch K is set smaller than the speed difference $\Delta n_K$ at the beginning of the third phase (t=t3) ($\Delta n_{K\_Z1} < \Delta n_K(t3)$). The third phase ends (t=t4) when the rotational speed difference $\Delta n_K$ at the separator clutch K has reached the target speed difference $\Delta n_{K\_Z1}$ to within a specified differential speed tolerance.

In the fourth phase (t=t4 to t5) the separator clutch K is completely closed in a steady manner ($x_K=1$), since in this case for example no continuous slip regulation of the separator clutch K is provided.

Figure 1A:
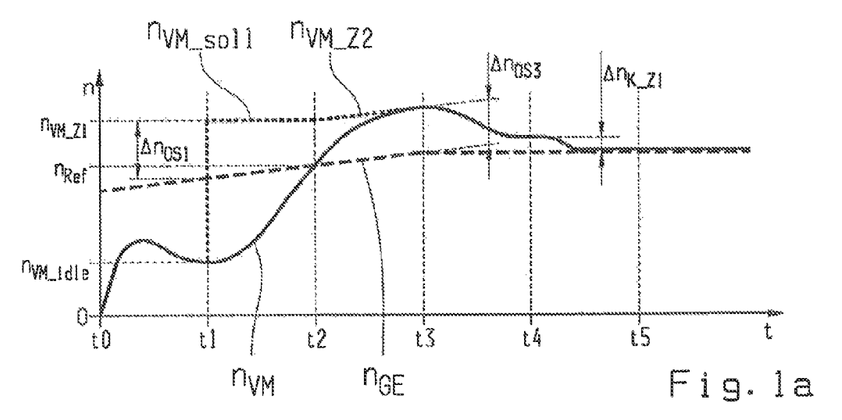
FIG. 1a: Relevant rotational speed variations in a parallel-action hybrid drive-train according to FIG. 3 during a first control sequence according to the invention for coupling an internal combustion engine.
Figure 1B:
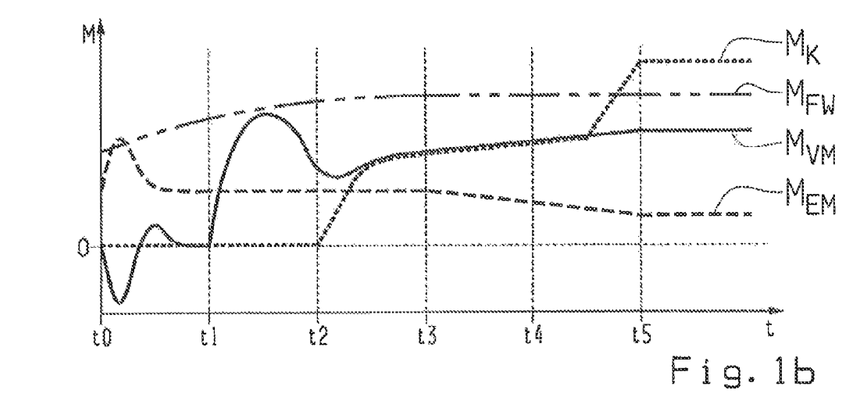
FIG. 1b: Relevant rotational speed variations in the hybrid drive-train of FIG. 3 during the first control sequence according to the invention for coupling the internal combustion engine.
Figure 1C:
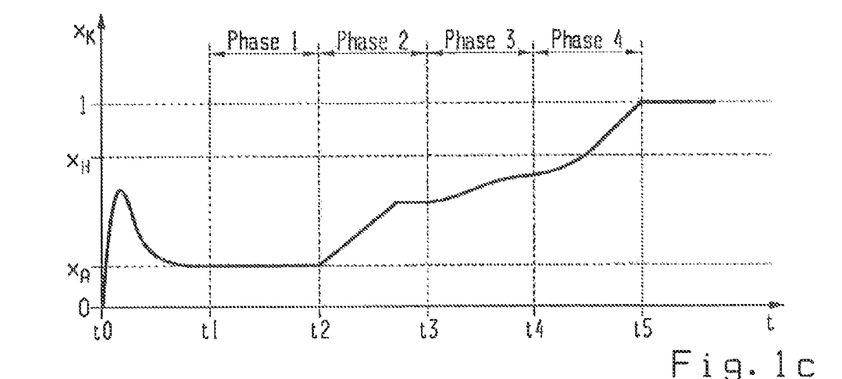
FIG. 1c: The closing degree of a separator clutch of the hybrid drive-train in FIG. 3 during the first control sequence according to the invention for coupling the internal combustion engine.
Figure 2A:
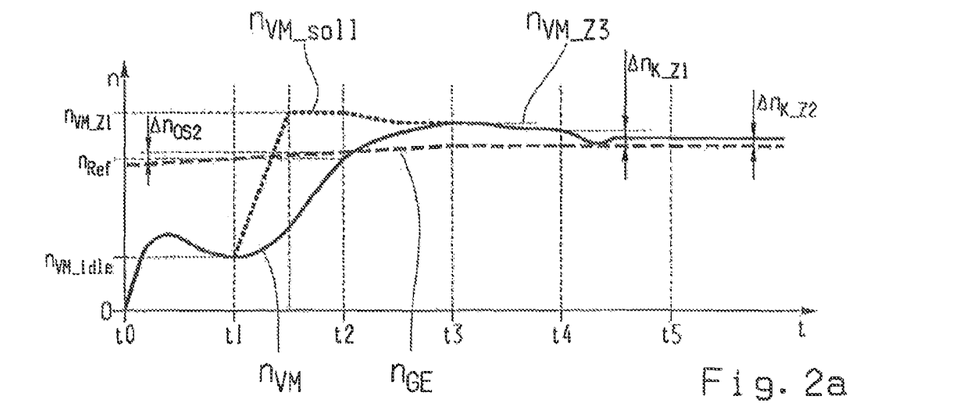
FIG. 2a: Relevant rotational speed variations in the parallel-action hybrid drive-train of FIG. 3 during the second control sequence according to the invention for coupling the internal combustion engine.
Figure 2B:
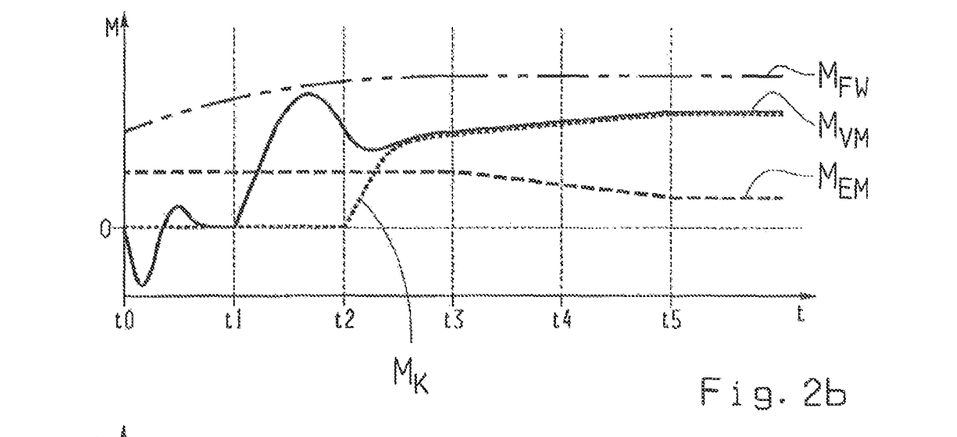
FIG. 2b: Relevant rotational speed variations in the hybrid drive-train of FIG. 3 during the second control sequence according to the invention for coupling the internal combustion engine.
Figure 2C:
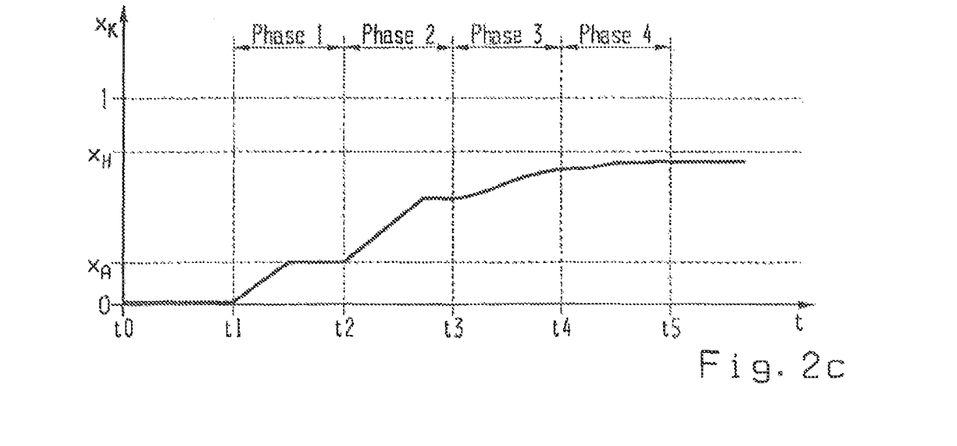
FIG. 2c: The closing degree of a separator clutch of the hybrid drive-train in FIG. 3 during the second control sequence according to the invention for coupling the internal combustion engine.

In the rotational speed variations $n_{VM}(t)$, $n_{GE}(t)$ of the internal combustion engine VM and the transmission input shaft 4, shown in FIG. 2a, the torque variations $M_{VM}(t)$, $M_K(t)$, $M_{EM}(t)$ of the internal combustion engine VM, the separator clutch K and the electric machine EM and also that of the torque $M_{FW}(t)$ desired by the driver, shown in FIG. 2b, and the closing degree variation $x_K(t)$ of the separator clutch K, shown in FIG. 2c, a second method variant for coupling the internal combustion engine VM is described, which however, differs only in some details from the first method variant according to FIGS. 1a to 1c.

In this case the internal combustion engine VM is started, for example, by means of an associated electric starter motor, so that at time t1 the separator clutch K is fully open ($x_K(t1)=0$). To achieve rapid response behavior for the subsequent closing process, during the first phase (t=t1 to t2) the separator clutch is closed as far as its touch-point ($x_K=x_A$). Furthermore, at the beginning of the first phase (t=t1) the desired speed $n_{VM\_soll}$ of the speed regulation of the internal combustion engine VM is now increased along a gradient and thus steadily from the idling speed $n_{VM\_idle}$ to the target speed $n_{VM\_Z1}$, which results in a less steep speed increase $dn_{VM}/dt$ of the internal combustion engine VM. The first phase again ends (t=t2) when the engine speed $n_{VM}$ has reached or exceeded the reference speed $n_{Ref}$ lower than the target speed $n_{VM\_Z1}$ ($v_{NM} \geq n_{Ref}$). In this case, however, the reference speed $n_{Ref}$ is for example defined lower than the current transmission input speed $n_{GE}$ by a speed offset $\Delta n_{OS2}$ ($n_{Ref}=n_{GE}(t2)-\Delta n_{OS2}$).

A further difference from the first method variant according to FIGS. 1a to 1c is that in the second phase (t=t2 to t3) the corrected target speed $n_{VM\_Z3}$ of the speed regulation of the internal combustion engine VM is now kept at a lower level, lying between the target speed $n_{VM\_Z1}$ in the first phase and the current transmission input speed $n_{GE}(t2)$ ($n_{GE}(t2) < n_{VM\_Z3} < n_{VM\_Z1}$). For this, the desired speed $n_{VM\_soll}$ of the speed regulation of the internal combustion engine VM at the beginning of the second phase (t=t2) is reduced steadily, in particular along a gradient, from the target speed $n_{VM\_Z1}$ of the first phase to the corrected target speed $n_{VM\_Z3}$. By reducing the speed difference $\Delta n_K$ in this manner the thermal loading of the separator clutch K is decreased and its useful life is thereby extended.

The speed difference $\Delta n_{K\_Z1}$ regulated at the separator clutch K during the third phase (t=t3 to t4) is in this case correspondingly smaller than was the case in the first method variant according to FIGS. 1a to 1c. In the fourth phase (t=t4 to t5), with continued differential speed regulation, the separator clutch K is now regulated to a lower target speed difference $\Delta n_{K\_Z2}$ suitable for sustained slipping operation ($\Delta n_{K\_Z2} < \Delta n_{K\_Z1}$), since in this case continuous slip regulation of the separator clutch K is provided in order to damp the rotation fluctuations of the internal combustion engine VM. In this mode of operation the separator clutch K is closed as far as its respective gripping point $x_H$.

INDEXES

1 Hybrid drive-train
2 Driveshaft, crankshaft
3 Rotor of the electric machine
4 Transmission input shaft
5 Transmission
6 Transmission output shaft
7 Axle differential
8a, 8b Drive wheels
EM Electric machine
K Separator clutch, friction clutch
M Torque
$M_{EM}$ Torque from the electric machine
$M_{FW}$ Torque desired by the driver
$M_K$ Torque that can be transmitted by the separator clutch
$M_{K\_soll}$ Nominal torque of the separator clutch
$M_{VM}$ Torque from the internal combustion engine
$M_{VM\_Ziel}$ Target torque of the internal combustion engine
n Rotational speed
$n_{EM}$ Rotational speed of the electric machine
$n_{GE}$ Transmission input speed
$n_{Ref}$ Reference speed
$n_{VM}$ Rotational speed of the internal combustion engine
$n_{VM\_idle}$ Idling speed of the internal combustion engine
$n_{VM\_soll}$ Desired speed of the internal combustion engine
$n_{VM\_Z1}$ Target speed of the internal combustion engine $n_{VM\_Z2}$ Corrected target speed of the internal combustion engine
$n_{VM\_Z3}$ Corrected target speed of the internal combustion engine
t Time
t0 to t5 Time points
VM Internal combustion engine
$x_A$ Touch-point of the separator clutch
$x_H$ Gripping point of the separator clutch
$x_K$ Degree of closure of the separator clutch
ΔM Torque difference, differential torque
$ΔM_{min}$ Minimum torque difference
$ΔM_{OS}$ Offset torque
Δn Rotational speed difference
$Δn_K$ Rotational speed difference at the separator clutch
$Δn_{K\_min}$ Minimum rotational speed difference at the separator clutch
$Δn_{\_Z1}$ First target speed difference at the separator clutch
$Δn_{\_Z2}$ Second target speed difference at the separator clutch
$Δn_{OS1}$ Speed offset
$Δn_{OS2}$ Speed offset
$Δn_{OS3}$ Speed difference
$Δn_{T1}$ Differential speed tolerance
$Δn_{T2}$ Differential speed tolerance
$dn_{VM}/dt$ Speed gradient of the internal combustion engine
$dx_K/dt$ Closing rate of the separator clutch
$dΔn_K/dt$ Differential speed gradient at the separator clutch
$(dΔn_K/dt)_{max}$ Maximum differential speed gradient at the separator clutch
$(dΔn_K/dt)_{min}$ Minimum differential speed gradient at the separator clutch

The invention claimed is:

1. A method of controlling a hybrid drive-train of a motor vehicle, which comprises an internal combustion engine (VM) with a driveshaft (2), an adjustable-ratio transmission (5) with a transmission input shaft (4), and a transmission output shaft (6) in driving connection with either an axle transmission or a transfer box (7), an electric machine (EM) that is operable at least as a motor having a rotor (3) that is drive-connected to the transmission input shaft (4), and an automated friction separator clutch (K) is arranged between the driveshaft (2) of the internal combustion engine (VM) and the transmission input shaft (4) such that, starting from electrically powered driving with the separator clutch disengaged ($x_K=0$; $x_K=x_A$), when a power increase is demanded and following starting, of the internal combustion engine, the internal combustion engine (VM) is accelerated to a transmission input speed ($n_{GE}$) and is coupled to the transmission input shaft (4) by engaging the separator clutch ($x_K=1$; $x_A<x_K<x_H$), the method comprising the steps of:

accelerating the internal combustion engine, during a first phase (t=t1 to t2), toward a target rotational speed ($n_{VM\_Z1}$) which is higher than the transmission input speed ($n_{GE}$) ($n_{VM\_Z1}>n_{GE}$), until a reference engine speed ($n_{Ref}$), that is lower than the target rotational speed ($n_{VM\_Z1}$) is either reached or exceeded ($n_{VM}≥n_{Ref}$, $n_{Ref}<n_{VM\_Z1}$), while the separator clutch (K) remains disengaged;

adjusting the internal combustion engine (VM), during a second phase (t=t2 to t3), to a corrected target rotational speed ($n_{VM\_Z2}$, $n_{VM\_Z3}$) which is above the transmission input speed ($n_{GE}$) ($n_{VM\_Z2}>n_{GE}$, $n_{VM\_Z3}>n_{GE}$) while the separator clutch (K) is engaged until a target torque ($M_{VM\_Ziel}$) of the internal combustion engine (VM) is reached ($M_K=M_{VM\_Ziel}$);

adjusting the internal combustion engine (VM), during a third phase (t=t3 to t4), to the target torque ($M_{VM\_Ziel}$) while adjusting the separator clutch (K) to a target rotational speed difference ($Δn_{K\_Z1}$) ($Δn_K=Δn_{K\_Z1}$); and adjusting the separator clutch (K), during a fourth phase (t=t4 to t5), to an engaged condition for sustained operation thereof, while the speed of the internal combustion engine (VM) is controlled ($x_K=1$; $Δn_K=Δn_{K\_Z2}$).

2. The method according to claim 1, further comprising the step of, during the first phase (t=t1 to t2), either
holding the separator clutch (K) at a touch-point ($x_K=x_A$) when the separator clutch is already engaged as far as the touch-point at a beginning of the first phase (t=t1) ($x_K(t1)=x_K(t2)=x_A$), or
engaging the separator clutch as far as the touch-point ($x_K=x_A$) when, at the beginning of the first phase (t=1), the separator clutch is fully disengaged ($x_K(t1)=0$; $x_K(t2)=x_A$).

3. The method according to claim 1, further comprising the step of, at a beginning of the first phase (t=t1) ($n_{VM\_Z1}=n_{GE}(t1)+Δn_{OS1}$), setting the target rotational speed ($n_{VM\_Z1}$) of the internal combustion engine (VM) at a value higher by a speed offset ($Δn_{OS1}$) of 50 to 200 revolutions per minute than the transmission input speed ($n_{GE}$).

4. The method according to claim 1, further comprising the step of, at a beginning of the first phase (t=t1), increasing a desired speed ($n_{VM\_soll}$) of the internal combustion engine (VM) from a current engine speed ($n_{VM}(t1)=n_{VM\_idle}$) to the target rotational speed ($n_{VM\_Z1}$).

5. The method according to claim 1, further comprising the step of ending the first phase (t=t2) when the reference engine speed ($n_{Ref}$) is one of; equal to the transmission input speed ($n_{GE}(t2)$) above the transmission input speed by a set speed offset ($Δn_{OS2}$); and below the transmission input speed ($n_{GE}(t2)$) by the set speed offset ($Δn_{OS2}$) ($n_{Ref}=n_{GE}(t2)$; $n_{Ref}=n_{GE}(t2)±Δn_{OS2}$).

6. The method according to claim 1, further comprising the step of, at a beginning of the second phase (t=t2), keeping the corrected target rotational speed ($n_{VM\_Z2}$) of the internal combustion engine (VM) at a constant speed difference ($Δn_{OS3}$) away from the transmission input speed ($n_{GE}$) ($n_{VM\_Z2}=n_{GE}=Δn_{OS3}$).

7. The method according to claim 1, further comprising the step of keeping the corrected target rotational speed of the internal combustion engine (VM) at a lower level lying between the target rotational speed ($n_{VM\_Z1}$) of the first phase and the transmission input speed ($n_{GE}(t2)$) ($n_{GE}(t2)<n_{VM\_Z3}<n_{VM\_Z1}$) in the second phase (t=t2 to t3).

8. The method according to claim 7, further comprising the step of, at a beginning of the second phase (t=t2), reducing a desired speed ($n_{VM\_soll}$) of the internal combustion engine (VM) along a gradient from the target rotational speed of the first phase ($n_{VM\_Z1}$) to the corrected target rotational speed ($n_{VM\_Z3}$).

9. The method according to claim 1, further comprising the step of determining the target torque ($M_{VM\_Ziel}$) of the internal combustion engine (VM) either by:
subtracting a current torque ($M_{EM}$) of the electric machine ($M_{VM\_Ziel}=M_{FW}-M_{EM}$) from a desired torque ($M_{FW}$) which is requested by a driver; or
subtracting the current torque ($M_{EM}$) of the electric machine (EM) and a set offset torque ($Δ_{MOS}$) from the desired torque ($M_{FW}$) ($M_{VM\_Ziel}=M_{FW}-M_{EM}-Δ_{MOS}$).

10. The method according to claim 1, further comprising the step of increasing a desired torque ($M_{K\_soll}$) of the separator clutch (K) that is set by engaging the separator clutch ($x_K>x_A$), at a beginning of the second phase (t=t2), to the target torque ($M_{VM\_Ziel}$) of the internal combustion engine (VM), the desired torque (MK_soll) of the separator clutch (K) being increased along a gradient.

11. The method according to claim 1, further comprising the step of limiting an engaging rate ($dx_K/dt$) of the separator clutch (K) by at least one of maintaining a minimum speed difference ($\Delta n_{K\_min}$) at the separator clutch and maintaining a maximum differential speed gradient ($(d\Delta n_K/dt)_{max}$) at the separator clutch ($\Delta n_K \geq \Delta n_{K\_min}$; $|d\Delta n_K/dt| \leq (d\Delta n_K/dt)_{max} > 0$).

12. The method according to claim 1, further comprising the step of utilizing, during the second phase (t=t2 to t3), torque (MK) that is transmittable by the separator clutch (K), which is determined by a current engaging degree of the separator clutch ($x_K > x_A$), as either a pilot torque or part of a pilot torque for regulating speed of the internal combustion engine (VM).

13. The method according to claim 1, further comprising the step of ending the second phase (t=t3) once the internal combustion engine (VM) reaches the target rotational speed ($n_{VM\_Z2}$; $n_{VM\_Z3}$) to within a specified differential speed tolerance (($\Delta n_{T1}$)($n_{VM}(t3)=n_{VM\_Z2} \pm \Delta n_{T1}$; $n_{VM}(t3)=n_{VM\_Z3} \pm \Delta n_{T1}$), and when either:
a size of a differential speed gradient ($d\Delta n_K/dt$) at the separator clutch has either reached or fallen below a specified minimum differential speed gradient (($d\Delta n_K/dt)_{min}$) ($|d\Delta n_K/dt| \leq (d\Delta n_K/dt)_{min} > 0$) or
a size of a difference between torque (MK) produced by the internal combustion engine (VM) and torque (MK) that is transmittable via the separator clutch (K) either reaches or falls below a specified minimum torque difference ($\Delta M_{min}$)($|M_{VM} - M_K| \leq \Delta M_{min} > 0$).

14. The method according to claim 1, further comprising the step of, at a beginning of the third phase (t=t3) ($\Delta n_{K\_Z1} < \Delta n_K(t3)$), setting the target rotational speed difference ($\Delta n_{K\_Z1}$) of the separator clutch (K) smaller than an initial speed difference ($\Delta n_K$) of the separator clutch.

15. The method according to claim 14, further comprising the step of steadily reducing a desired speed difference ($\Delta n_{K\_soll}$) of the separator clutch (K), at the beginning of the third phase (t=t3), from a current speed difference ($\Delta n_K(t3)$) to the target rotational speed difference ($\Delta n_{K\_Z1}$).

16. The method according to claim 1, further comprising the step of utilizing a current torque ($M_{VM}$) of the internal combustion engine (VM), during the third phase (t=t3 to t4), as either a pilot torque or part of a pilot torque for regulating a differential speed of the separator clutch (K).

17. The method according to claim 1, further comprising the step of ending the third phase (t=t4) when a speed difference ($\Delta n_K$) at the separator clutch (K) reaches the target rotational speed difference ($\Delta n_{K\_Z1}$) to within a specified differential speed tolerance ($\Delta n_{T2}$) ($\Delta n_K(t4) = \Delta n_{k\_Z1} \pm \Delta n_{T2}$).

18. The method according to claim 1, further comprising the steps of:
fully engaging ($X_K=1$) the separator clutch (K), during the fourth phase (t =t4 to t5), when the separator clutch (K) is not provided with continuous slip regulation, and
continuing differential speed regulation, to regulate the separator clutch to a lower target speed difference ($\Delta n_{K\_Z2}$) for sustained slipping operation ($\Delta n_{K\_Z2} < \Delta n_{K\_Z1}$), when continuous slip regulation of the separator clutch (K) is provided.

* * * * *